(12) United States Patent
Gill et al.

(10) Patent No.: US 7,277,647 B2
(45) Date of Patent: Oct. 2, 2007

(54) SYSTEM AND METHOD OF OPTICAL TRANSMISSION

(75) Inventors: Douglas M Gill, South Orange, NJ (US); Xiang Liu, Marlboro, NJ (US); Xing Wei, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 932 days.

(21) Appl. No.: 10/099,105

(22) Filed: Mar. 14, 2002

(65) Prior Publication Data

US 2004/0208647 A1  Oct. 21, 2004

(51) Int. Cl.
*H04B 10/04* (2006.01)

(52) U.S. Cl. .................. 398/188; 398/182; 398/189

(58) Field of Classification Search ............... 398/188, 398/189, 182
See application file for complete search history.

(56) References Cited

U.S. PATENT DOCUMENTS

| | | | |
|---|---|---|---|
| 2,977,417 A | 3/1961 | Doelz et al. .................. 178/51 |
| 4,995,052 A * | 2/1991 | Thorvaldsen ................ 375/150 |
| 5,400,165 A * | 3/1995 | Gnauck et al. ............. 398/160 |
| RE37,621 E * | 4/2002 | Henmi et al. ................ 398/178 |
| 6,396,605 B1 * | 5/2002 | Heflinger et al. ........... 398/140 |
| 6,525,857 B1 * | 2/2003 | Way et al. .................... 398/192 |
| 6,563,623 B1 * | 5/2003 | Penninckx et al. ......... 398/188 |
| 6,567,394 B1 * | 5/2003 | Arisawa ....................... 370/343 |
| 6,763,197 B1 * | 7/2004 | Hirano et al. ............... 398/192 |
| 2003/0026199 A1 * | 2/2003 | Myers ......................... 370/208 |
| 2003/0063683 A1 * | 4/2003 | MacFarlane et al. ........ 375/295 |
| 2003/0157905 A1 * | 8/2003 | Holmqvist ................... 455/102 |

OTHER PUBLICATIONS

Journal of Lightwave Technology, "Modulation and Detection Characteristics of Optical Continuous Phase FSK Transmission System," vol. LT-5, No. 4 Apr. 1987 by Iwashita et al.*
IEEE transactions on instrumentation and measurement, "A novel Technique for Testing Pulsed RF MSK DAta Communication Devices," vol. 49 No. 5 Oct. 2000 by Bucci et al.*
"Novel intersymbol interference reduction technique by bit synchronized p/2 phase shift," 2000, University of Karlsruhe, Germany Communications Laboratory p. 465.*

(Continued)

*Primary Examiner*—Kenneth Vanderpuye
*Assistant Examiner*—Ken Malkowski

(57) ABSTRACT

Minimum shift keying (MSK) is used as the coding scheme in a high bit rate optical transmission system, and the signal format is either RZ (return-to-zero) or NRZ (non-return-to-zero). The system can combine multiple individual channels with different wavelengths in a WDM or dense wavelength division multiplexed (DWDM) arrangement. Dispersion management can be provided using several techniques, such as quasi-linear transmissions or conventional RZ transmissions. At the transmitter, an optical MSK transmitter is used to modulate the phase of a stream of high bit rate (e.g., 40 Gbit/s) optical signals. Many such data streams can be combined in a wavelength division multiplexer and transmitted to a remote receiver, where the signal is wavelength division demultiplexed. The encoded data in each wavelength channel is then recovered by an MSK receiver, which may consist of a delay demodulator and a balanced detector.

10 Claims, 10 Drawing Sheets

OTHER PUBLICATIONS

Rudi de Buda, "Coherent Demodulation of Frequency-Shift Keying with Low Deviation Ratio", *IEEE Transactions on Communications,* vol. 20, No. 3, Jun. 1972, pp. 429-435.

Katsushi Iwashita et al., "Modulation and Detection Characteristics of Optical Continuous Phase FSK Transmission System", *Journal of Lightwave Technology,* vol. LT-5, No. 4, Apr. 1987, pp. 452-460.

M. Shirasaki, et al., "Fibre Transmission Properties of Optical Pulses Produced Through Direct Phase Modulation of DFB Laser Diode", *Electronics Letters,* vol. 24, No. 8, Apr. 14, 1988, pp. 486-488.

\* cited by examiner

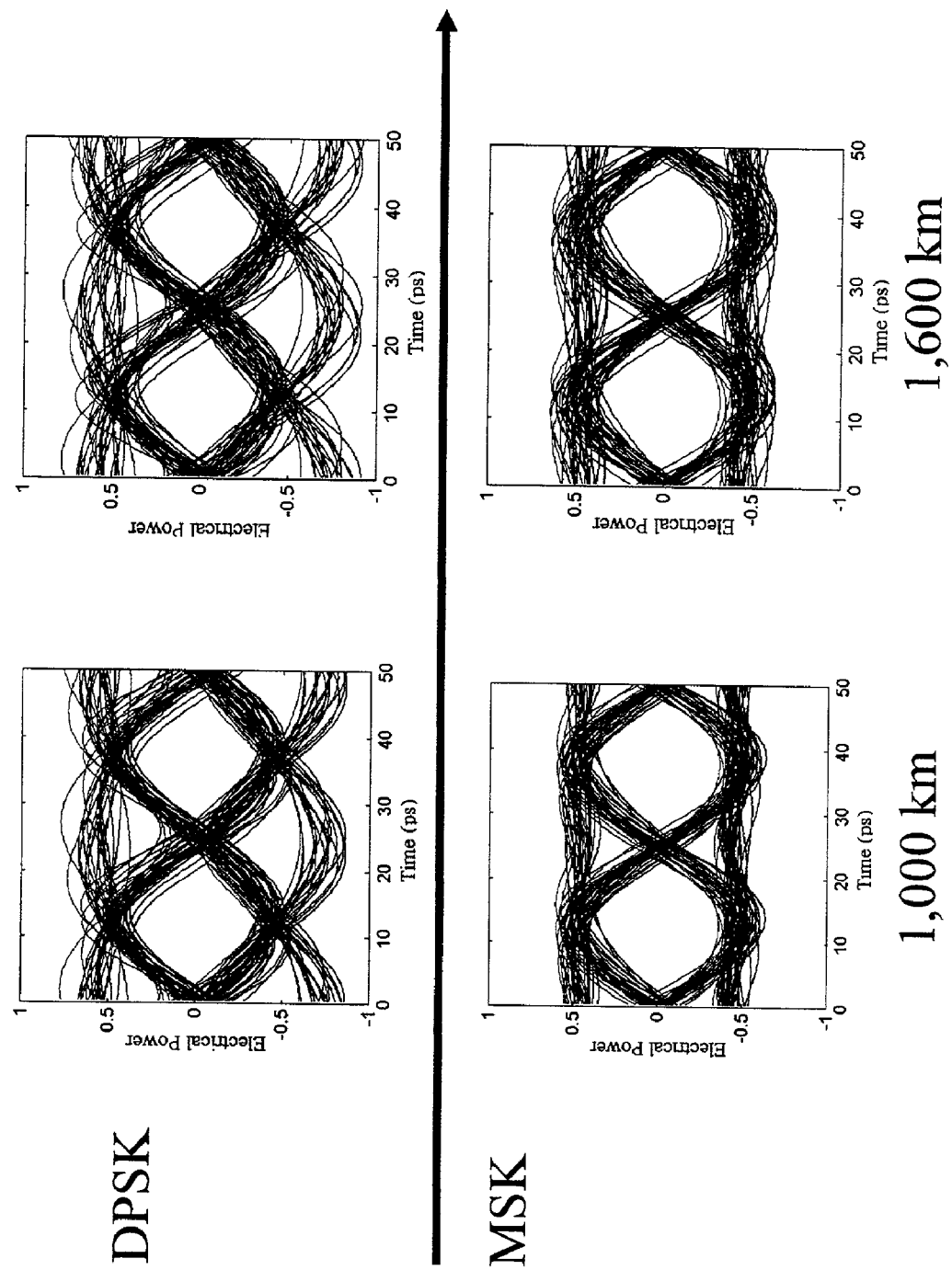
FIG. 7A DPSK
FIG. 7B MSK

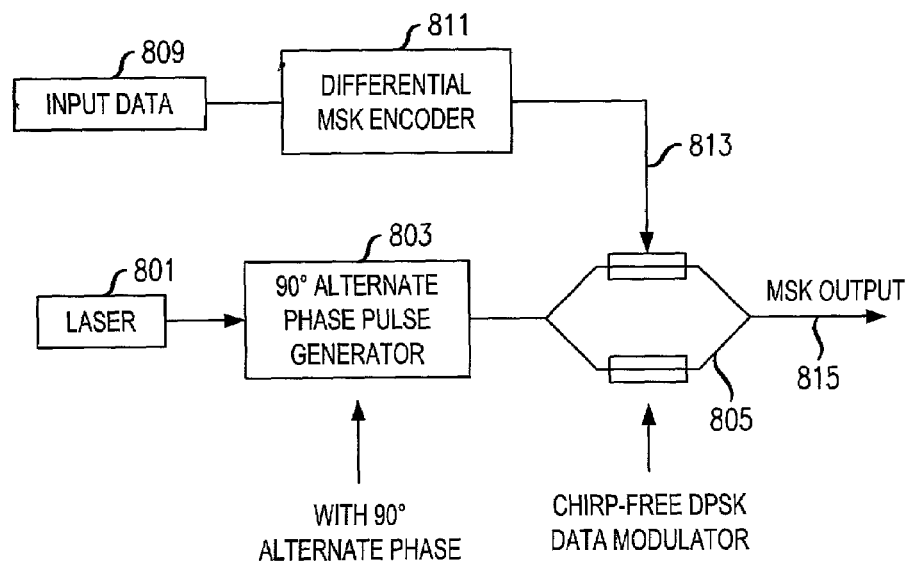
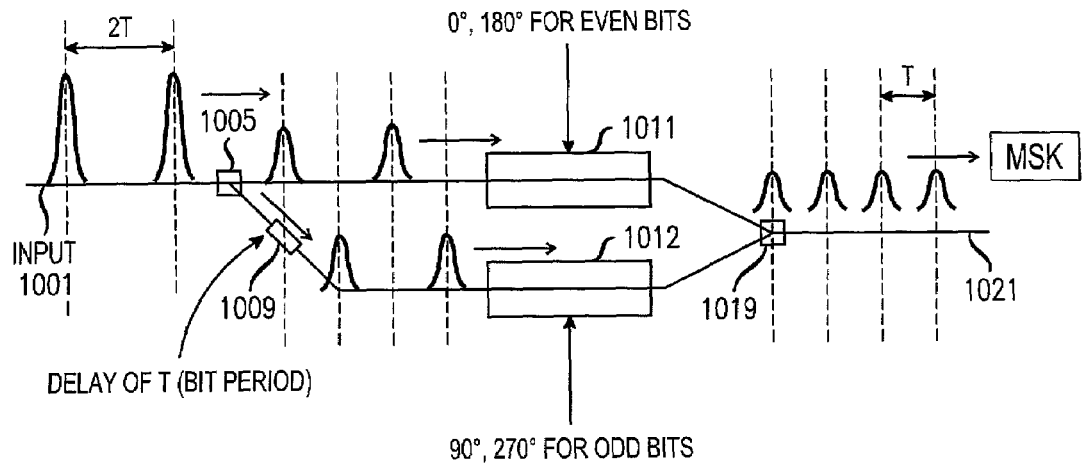

SYSTEM AND METHOD OF OPTICAL TRANSMISSION

TECHNICAL FIELD

The present invention relates to optical communications, and more particularly to an arrangement for optical transmission using minimum shift keying (MSK), that can be used in a high bit rate (e.g., 10 Gbit/s or 40 Gbit/s) optical communication system, including a wavelength division multiplexed (WDM) system.

BACKGROUND OF THE INVENTION

The explosive growth of optical communications has generated the need to develop modulation and coding schemes that are robust against distortion over long transmission distances, easy to implement, and reliable. With respect to phase shift modulation alone, much work has been published regarding, for example, phase shift keying (PSK), differential phase shift keying (DPSK), and quadrature phase shift keying (QPSK), to name a few. To date, while many proposals have been made, there is still a need to improve the long haul performance of such systems.

SUMMARY OF THE INVENTION

In accordance with the present invention, minimum shift keying (MSK) is used as the coding scheme in a high bit rate optical transmission system, and the signal format is either RZ (return-to-zero) or NRZ (non-return-to-zero). The system can combine multiple individual channels with different wavelengths in a WDM or dense wavelength division multiplexed (DWDM) arrangement. Dispersion management can be provided using several techniques, such as quasi-linear transmissions or conventional RZ transmissions.

At the transmitter, an optical MSK transmitter is used to modulate the phase of a stream of high bit rate (e.g., 40 Gbit/s) optical signals. Many such data streams can be combined in a wavelength division multiplexer and transmitted to a remote receiver, where the signal is wavelength division demultiplexed. The encoded data in each wavelength channel is then recovered by an MSK receiver, which may consist of a delay demodulator and a balanced detector.

Similar to DPSK (which is described in co-pending application Ser. No. 09/990,964 (Chraplyvy 28-3-1-7) entitled "Long Haul Transmission In A Dispersion Managed Optical Communication System", filed on Nov. 21, 2001, and assigned to the same assignee as the present invention, MSK coding has an approximately 3 dB higher receiver sensitivity than on-off keying (OOK) in a linear channel when a balanced receiver is used, and allows for transmission with lower optical power. A lower optical power helps reduce penalties from nonlinear effects, such as cross phase modulation (XPM) and four wave mixing (FWM).

Compared with DPSK, MSK has the additional advantage of robustness against tight optical filters, which makes MSK a preferred coding scheme for high spectral efficiency systems and systems with optical add-drop multiplexers (OADM's).

BRIEF DESCRIPTION OF THE DRAWINGS

The present invention will be more fully appreciated by consideration of the following detailed description, which should be read in light of the drawing in which:

FIGS. 7A and 7B show the results of numerical simulations of 40 Gb/s DPSK and MSK with 50 GHz DWDM channel spacing;

FIG. 8 is a block diagram illustrating an optical MSK transmitter arranged in accordance with the present invention;

FIG. 10 is a block diagram illustrating another embodiment of an optical MSK transmitter;

DETAILED DESCRIPTION

Figure 1:
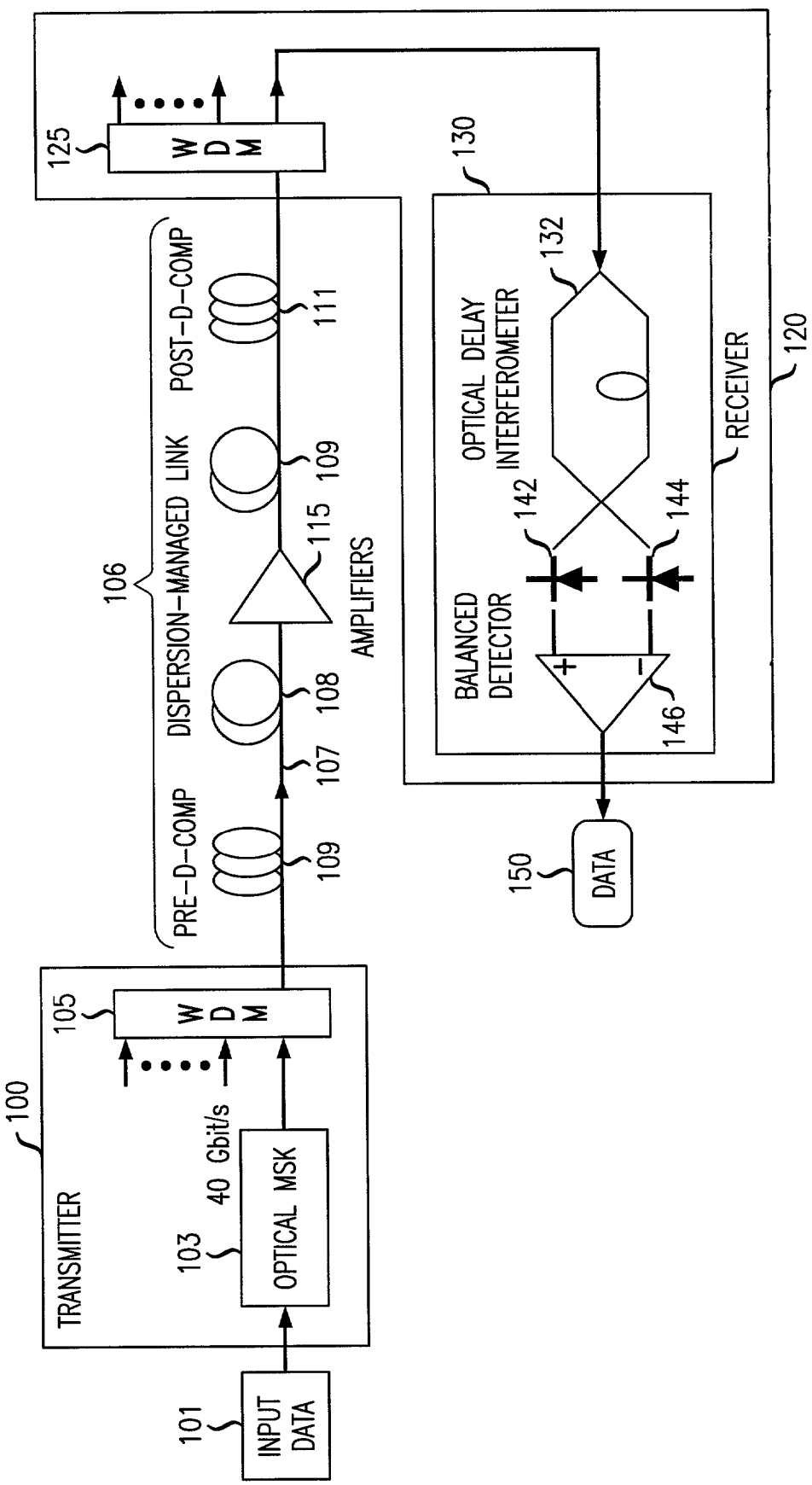
FIG. 1 is a schematic drawing of a WDM long haul transmission system using an MSK coding scheme in accordance with the present invention.

The following acronyms are used in this application:

| | |
|---|---|
| DCF | dispersion compensating fiber |
| DPSK | differential phase shift keying |
| FWHM | full width half maximum |
| FWM | four wave mixing |
| MSK | minimum shift keying |
| NRZ | non-return-to-zero |
| OADM | optical add drop multiplexer |
| OOK | on-off keying |
| OPI | orthogonal-phase-interleaved |
| RZ | Return-to-zero |
| SPM | self phase modulation |
| ULH | ultra-long haul |
| WDM | wavelength division multiplexing |
| XPM | cross phase modulation |

In considering the following detailed description, the disclosures contained in the following co-pending applications, which are assigned to the same assignee as the present invention, should be considered:

(1) "Long Haul Transmission in a Dispersion Managed Optical Communication System" (Chraplyvy 28-3-1-7), Ser. No. 09/990,964, filed Nov. 21, 2001 on behalf of Andrew Chraplyvy, Xiang Liu, Xing Wei and Chris Xu;

(2) "Long Haul Optical Communication System" (Liu 4-4-8), Ser. No. 09/990,965, filed Nov. 21, 2001 on behalf of Xiang Liu, Xing Wei and Chris Xu;

(3) "Optical MSK transmitter" (Gill 5-3), Ser. No. 09/933,644, filed Aug. 21, 2001 on behalf of Doug Gill and Xing Wei; and (4) "High-Bit-Rate Long-Haul Fiber Optic Communication System Techniques and Arrangements", filed concurrently herewith.

Minimum shift keying (MSK) is a known coding scheme in radio and microwave communications. See M. L. Doelz and E. T. Heald, "Minimum-shift data communication system", U.S. Pat. No. 2,977,417, Mar. 28, 1961. It is also sometimes called fast frequency shift keying (Fast FSK). See R. deBuda, IEEE Trans. Commun. COM-20, p. 429 (1972). However, MSK is rarely used in optical fiber communications. K. Iwashita and T. Matsumoto, in a paper entitled "Modulation and detection characteristics of optical continuous phase FSK transmission system", Journal of Lightwave Technology, Vol. LT-5, 452-460 (1987), considered MSK as a special case of continuous phase frequency shift keying (CPFSK) for optical fiber communications. In the approach described, an optical MSK signal with a constant amplitude was transmitted at a very low rate, 400 Mb/s, over a distance of 290 km and detected with heterodyne detection. However, the transmitter and receiver used in that experiment were both unable to handle the high-bit-rate (e.g., 40 Gb/s) WDM transmission systems that are desired today. For example, the heterodyne detection with a local laser oscillator is not practical in a real optical communication system.

In another paper entitled "Fiber transmission properties of optical pulses produced through direct phase modulation of DFB laser diode", Electronics Letters, Vol. 24, p. 486 (1988), M. Shirasaki, et al. transmitted a short data sequence (16 bits) at 4 Gb/s over 102 km of fiber using an optical signal that might, in some sense, be thought of as being similar to an MSK signal. However, the authors did not mention anything about MSK and did not address issues of balanced detection, nor issues relating to fiber non-linearity, that are essential to a modern day optical transmission arrangement. The directly-frequency-modulated laser is also believed to be not practical to handle high bit rate like 40 Gb/s. Despite these early studies related to MSK, it has never been successfully used in high speed, long haul optical fiber communications.

Referring now to FIG. 1, there is shown a schematic drawing of a WDM transmission system using an MSK coding arrangement in accordance with the present invention. At the transmitter 100, an optical MSK coder 103 is used to modulate the phase of a stream of high bit rate (e.g., 40 Gbit/s) optical signals as a function of input data received from a data source 101. There are various methods to generate the optical MSK signal in coder 103, and these will be described later. A plurality of MSK coded data streams such as the stream output from coder 103 are combined in a wavelength division multiplexer 105, and transmitted to a remote receiver 120 via optical fiber spans designated generally as 106, which generally include pre and post dispersion compensation 109 and 111, respectively, amplification such as amplifier 115, as well as dispersion-managed fiber spans 108 and 109. At the receiver designated generally as 120, the multiplexed signal is wavelength division demultiplexed in demultiplexer 125, and the encoded data in each wavelength channel is recovered by an MSK decoder 130, which includes an optical delay interferometer 132, photodiodes 142 and 144, and a balanced detector 146, all of which will be described more fully below. The recovered data is supplied to a desired utilization device 150.

Figure 2:
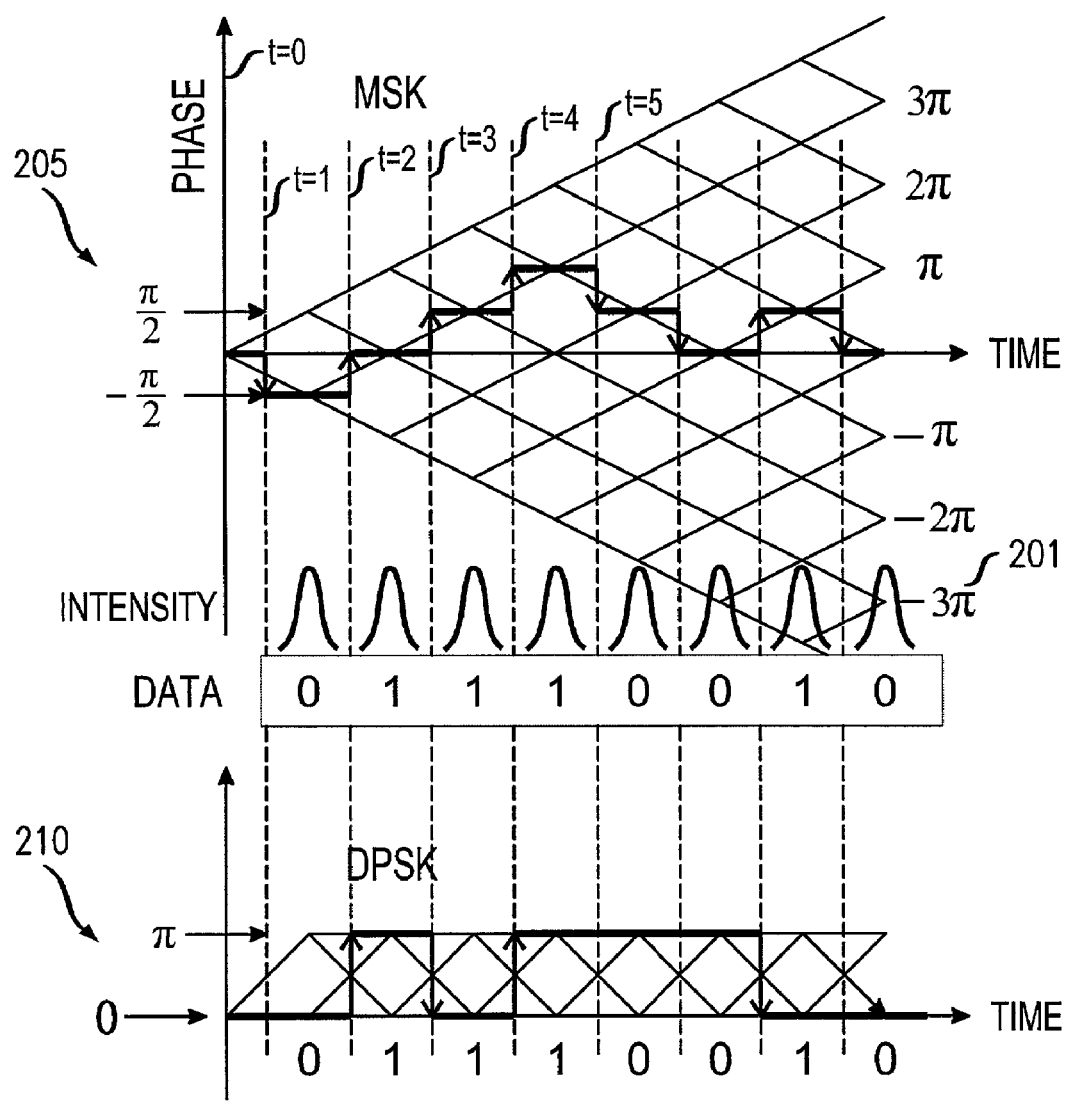
FIG. 2 is diagram comparing the "phase tree" of MSK with the phase tree of DPSK.

FIG. 2 is a diagram that shows the "phase tree" 205 for an MSK coded signal, as compared with the phase tree 210 for a DPSK encoded signal. In this example, a data sequence "01110010" is transmitted with a train of RZ optical pulses 201. The characteristics of RZ optical pulses 201 are that the intensity of each pulse "returns" to or near zero at the end of each pulse interval; at the mid-point of each pulse interval, the intensity is "high". For both MSK and DPSK, we assume the phase is constant (or "flat") across the pulse, and a phase shift occurs in between two adjacent pulses. For MSK, the minus sign denotes a phase shift in the opposite direction as compared to the $\pi/2$ phase shift. It should be noted that a phase shift of an integer number of $2\pi$ is physically indistinguishable from 0, and consequently a phase shift of $-\pi/2$ can also be represented as a phase shift of $3\pi/2$.

Considering now the exemplary data sequence "01110010", and assuming that the phase reference of the MSK signal is at phase 0 at time t=0, the first bit, which is a "0" causes a $-\pi/2$ phase shift at t=1; the next bit, which is a "1", causes a $\pi/2$ phase shift at t=2, so that the absolute phase is now 0. The next bit, which is also a "1", causes a $\pi/2$ phase shift at t=3, so that the absolute phase is now $\pi/2$. In a similar fashion, the phase continues as follows:

| Data Bit | Cause a phase shift of | Previous phase | Resulting Phase |
|---|---|---|---|
| 0 | $-\pi/2$ | 0 | $-\pi/2$ |
| 1 | $\pi/2$ | $-\pi/2$ | 0 |
| 1 | $\pi/2$ | 0 | $\pi/2$ |
| 1 | $\pi/2$ | $\pi/2$ | $\pi$ |
| 0 | $-\pi/2$ | $\pi$ | $\pi/2$ |
| 0 | $-\pi/2$ | $\pi/2$ | 0 |
| 1 | $\pi/2$ | 0 | $\pi/2$ |
| 0 | $-\pi/2$ | $\pi/2$ | 0 |

Persons skilled in the art will appreciate that the complementary scheme, i.e., wherein a 0 causes a $\pi/2$ shift, and a 1 causes $-\pi/2$ shift, can also be used.

For the purposes of comparing MSK with DPSK, FIG. 2 also includes a diagram illustrating the phase tree 210 produced by the same illustrative data sequence described in the table above, when encoded using DPSK as the coding scheme. Again assuming that the phase reference of the DPSK signal is at 0, the first data bit, a 0, causes the phase of the DPSK signal to remain the same, i.e. at 0. The next data bit, a 1, causes the phase of the DPSK signal to change from its previous value, i.e., to shift from 0 to $\pi$ (or 180 degrees). The next data bit is also a 1, and this bit causes the phase of the DPSK signal to change again, this time from its previous value, i.e., $\pi$, to 0. In this manner, the data sequence controls the phase of the DPSK signal such that a 1 causes a $\pi$ (or 180 degree) shift, and a 0 causes no shift. The phase of the output varies between 0 and $\pi$. From a comparison of the DPSK and MSK diagrams in FIG. 2, marked differences are seen. With MSK, the optical phases of all even-numbered pulses (in time slots 0, 2, 4, 6, . . . ) are either 0 or $\pi$, and the optical phases of all odd-numbered pulses (in time slots 1, 3, 5, 7, . . . ) are either $\pi/2$ or $3\pi/2$. DPSK does not have this property. With MSK, the phase in any given time-slot can have one of four different values, while with DPSK, only two possible phase values are used.

In an actual implementation of an MSK system in accordance with the present invention, the phase diagram of FIG. 2 is actually smoothed to some extent and therefore will not have the abrupt edges as shown in FIG. 2. Accordingly, it is to be understood that the representation presented in FIG. 2 is schematic and is intended for instructional purposes only.

Although this example of MSK described above in connection with FIG. 2 employs a pulsed light source (which will be referred to as RZ-MSK hereafter) to generate the train of RZ optical pulses 201 pulses, the MSK coding scheme can also be applied to a continuous light source, which will be referred to as NRZ-MSK hereafter. In fact, as the extinction ratio of the pulse train decreases (for example, when an RZ-MSK signal passes through a narrow band optical filter), RZ-MSK transforms to NRZ-MSK continuously, and there is no clear distinction between RZ-MSK and NRZ-MSK. In the following description, no distinction will be made between RZ-MSK and NRZ-MSK unless otherwise specified, and it will be assumed that pulses with either RZ or NRZ signal format can be used. It should also be noted that for RZ-MSK, it is preferred to have a constant phase across every pulse and keep the π/2 phase shift "jump" in between two pulses where the intensity is equal or close to zero. Stated differently, the timing of the phase transitions should be such that each of the phase transitions occur at approximately the same point in time as a signal intensity miminum.

Figure 3:
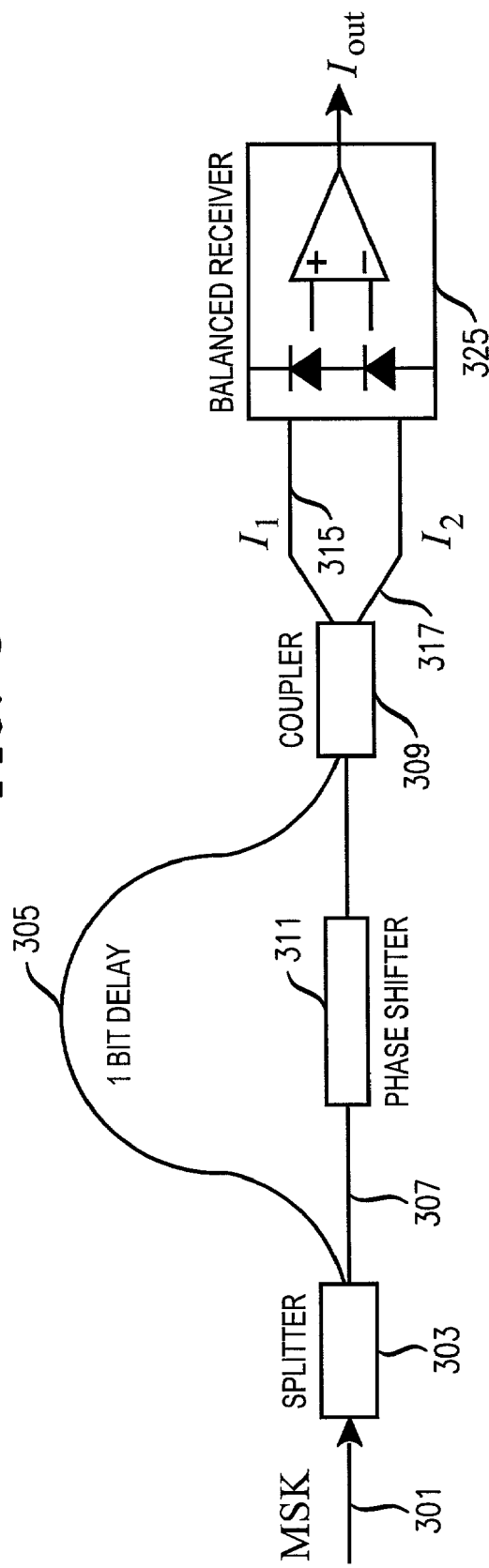
FIG. 3 is a diagram illustrating an MSK receiver arranged in accordance with the present invention.

In order to understand the operating principles for a receiver arranged to extract the original data from the MSK coded stream of optical pulses, we assume for simplicity that the complex amplitude of the nth light pulse is $$\tilde{A}_n = |A| exp(i\phi_n),$$

where $|A|$ is an constant and $\phi_n$ is the phase of the nth light pulse. In this example, a digital "1" and a digital "0" are transmitted with $\phi_n = \phi_{n-1} + \pi/2$ and $\phi_n = \phi_{n-1} - \pi/2$, respectively. Under these conditions, an MSK signal can be decoded in a manner similar to that used in connection with DPSK coding, such as with a one-bit-delay interferometer and a balanced receiver shown in FIG. 3. In that figure, the light signal received on input 301 is first split into two arms in splitter 303, with one arm 305 delayed by one bit period (for example, 25 ps for a data rate of 40 Gb/s) with respect to the other arm 307. At the end of the delay interferometer, the optical signals in the two arms are coherently combined with a coupler 309. A phase shifter 311 is provided to adjust the relative phase of the two arms of the delay interferometer. With this arrangement, the interference between two adjacent light pulses at one output 315 of the interferometer is given by:

$$(I_1)_n = \left|\frac{\tilde{A}_n + i\tilde{A}_{n-1}}{2}\right|^2 = \frac{|A|^2}{2}[1 + \sin(\phi_n - \phi_{n-1})],$$

and a different interference at the other output 317 of the interferometer is given by:

$$(I_2)_n = \left|\frac{\tilde{A}_n - i\tilde{A}_{n-1}}{2}\right|^2 = \frac{|A|^2}{2}[1 - \sin(\phi_n - \phi_{n-1})].$$

If $\phi_n = \phi_{n-1} + \pi/2$, we find $(I_1)_n = |A|^2$ and $(I_2)_n = 0$. On the other hand, if $\phi_n = \phi_{n-1} - \pi/2$, we find $(I_1)_n = 0$ and $(I_2)_n = |A|^2$. This indicates that $(I_1)_n$ corresponds to the original data, while $(I_2)_n$ from the other port of the interferometer corresponds to the inverted data. These two outputs can be further processed electronically with a balanced differential amplifier 325. It is known that such a balanced detection scheme helps improve the receiver sensitivity significantly.

For comparison purposes, it is noted that the above described arrangement differs from a DPSK delay demodulator, in which the two arms of the delay interferometer have a relative offset phase of π/2.

An optical MSK transmission system in accordance with the present invention has all of the advantages of an optical DPSK system, including improved receiver sensitivity, reduced nonlinear penalties, etc., which have been described in the co-pending application of Chraplyvy et al. However, MSK has additional advantages compared with DPSK. By equalizing the phase separation between two adjacent optical signals to π/2 (or 90 degrees), MSK is more robust against inter-symbol-interference (ISI) effects that arise from tight optical filtering. This is important for optical transmission systems with high spectral efficiencies and systems with multiple optical add drop multiplexers (OADM's), in which the so-called concatenated filtering effect may have a significant impact on the system performance.

Figure 4:
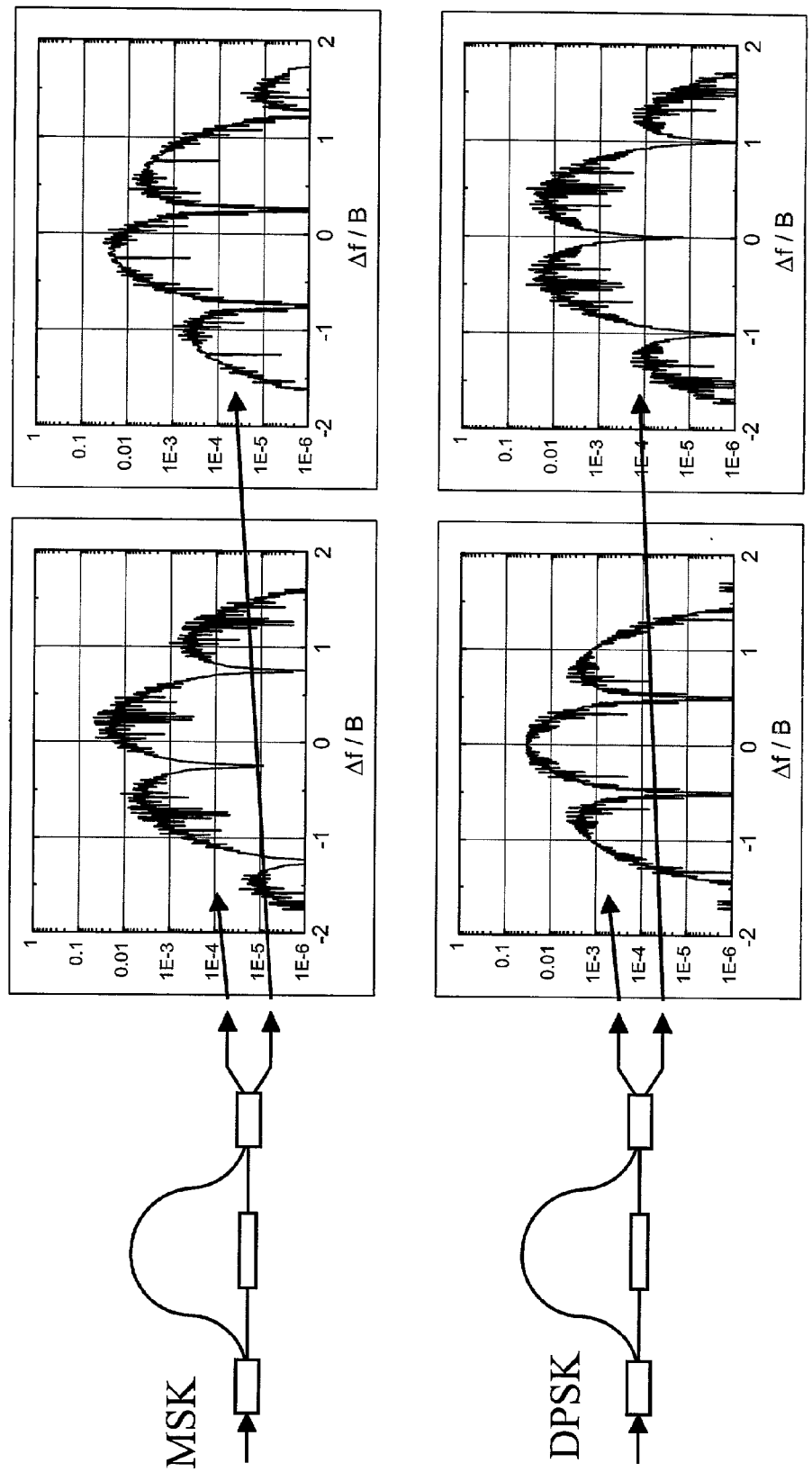
FIG. 4 is a diagram illustrating the optical power spectra of the demodulated signals of MSK and DPSK.

The advantages of MSK over DPSK can be explained by considering the symmetry of the optical power spectra of the demodulated optical signals from the two outputs of the delay interferometer, as shown in FIG. 4. With MSK, as shown in the upper portion of FIG. 4, the two outputs of the interferometer have similar optical power spectra (the two spectra are mirror images with the central frequency being the reflection plane), and therefore these two demodulated signals respond the same way to tight optical filtering. As a consequence, the differential output eye is symmetric around the decision level zero. In contrast, for DPSK, as shown in the lower portion of FIG. 4, the optical power spectra of the demodulated signals from the two outputs of the delay interferometer are qualitatively different. With tight optical filtering, the differential eye of DPSK is distorted and cannot remain symmetric around zero.

MSK has another advantage over DPSK which also deserves some explanation. When an RZ pulse train passes through a narrow optical filter, the pulses are broadened and may overlap and interfere with neighboring pulses. Between two adjacent pulses, the interference could be either constructive or destructive, depending on the relative phase between the two. For DPSK, this causes a pattern dependent intensity fluctuation of the optical signal, which may translate into pattern dependent nonlinear penalties (for example, pattern dependent nonlinear phase noise through SPM and intra-channel four wave mixing). For MSK, however, such a pattern dependent intensity fluctuation can be greatly reduced, because two adjacent optical pulses have a π/2 (or 90 degree) phase difference with respect to each other, and therefore do not interfere.

Figure 5:
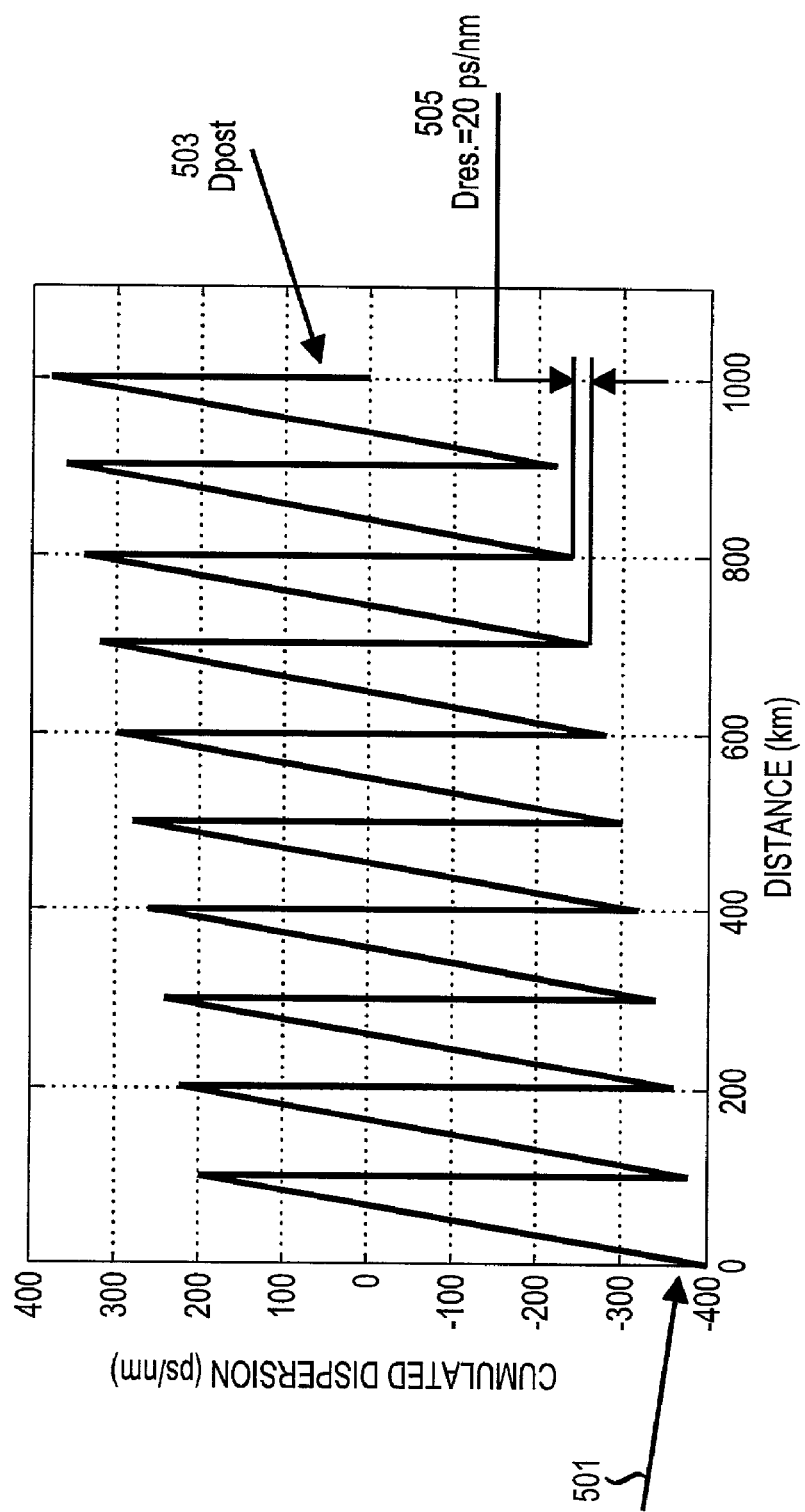
FIG. 5 is an illustration of the dispersion map and accumulated dispersion in a system in which dispersion management is employed in the optical communication medium connecting the transmitter to the receiver.
Figure 6A:
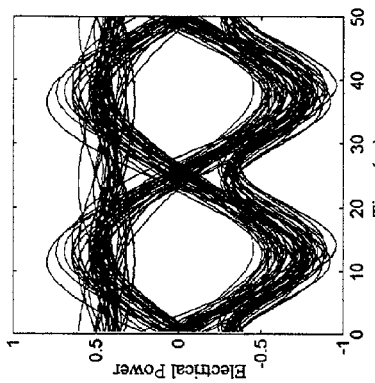
FIGS. 6A through 6F show the results of numerical simulations of DPSK and MSK transmissions with OADM.
Figure 6B:
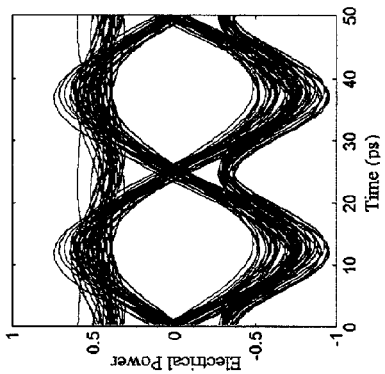
Figure 6C:
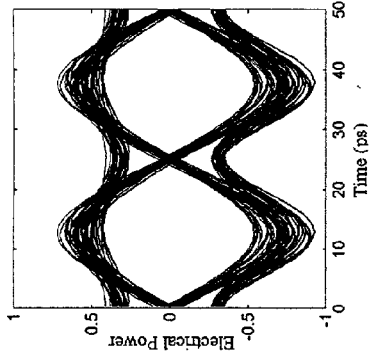
Figure 6D:
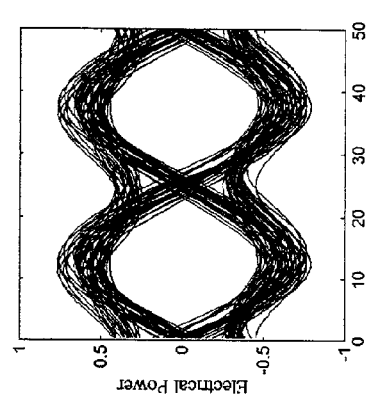
Figure 6E:
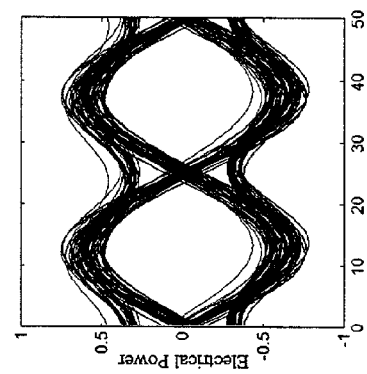
Figure 6F:
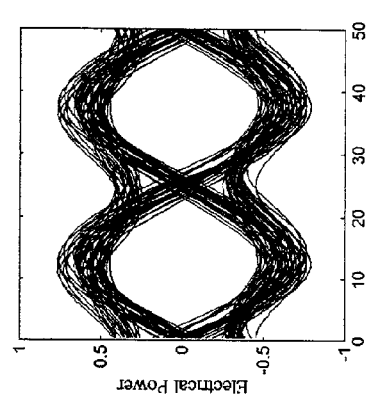

To perform long haul and ultra-long haul (ULH) transmissions of MSK signals, optical fiber spans with optical amplifiers and proper dispersion management are needed. In accordance with the present invention, dispersion compensation in the optical transmission medium can be achieved by using a dispersion managed fiber link, which can be implemented by the use of multiple fiber spans between transmitter and receiver, where each span comprises contiguous regions having negative and positive dispersion fibers. The dispersion map, which is a plot of dispersion vs. distance in a typical dispersion managed transmission medium arranged for high-speed data transmission, is shown in FIG. 5. There are four key parameters determining the dispersion map: (1) pre-dispersion compensation value, provided by the pre-compensator 109 of FIG. 1, which is shown as segment 501 in FIG. 5, (2) dispersion per transmission span, (3) residual dispersion per span (or the net dispersion induced by each pair of transmission fiber span and dispersion-compensating fiber), which is represented by the value of segment 505, and (4) post-dispersion compensation value provided by the post-compensator 111 of FIG. 1, which is shown as segment 503 in FIG. 5.

Some details of a system embodying the present invention (used in both numerical simulations and experiments) will be useful. RZ pulses with 33% duty-cycle can be used for 40 Gb/s MSK systems. An MSK WDM system can have many spans, for example, with each span consisting of 100 km of TWRS (D=6 ps/km/nm) and a dispersion compensating module made of DCF (D=−100 ps/km/nm). The length of the DCF is chosen to give the designed residual dispersion per span or path-averaged dispersion (Davg). The channel spacing is 100 GHz. A 85-GHz (FWHM) $3^{rd}$-order Gaussian filter can be used to demultiplex the channels, and the detection scheme for the RZ-MSK can be one-bit delayed differential direct detection. A 5th-order Bessel filter (electrical) with a 3 dB bandwidth of 0.7 bit-rate can be used after signal detection.

The advantages of MSK over DPSK in next generation optical networking systems with optical add-drop modules (OADM's) is illustrated in FIG. 6, which shows the eye diagrams at different transmission distances in both MSK (FIGS. 6D-6F) and DPSK (FIGS. 6A-6C) based systems. The simulations are based on the assumption that a $4^{th}$-order super-Gaussian OADM filter with 70-GHz 3-dB bandwidth is added every 600 km. The path averaged dispersion is assumed to be 0.2 ps/km/nm. The launch power and optical signal-to-noise ratio (OSNR) are assumed to be −4 dBm/ch and 35.5 dB/span, respectively. It is evident that MSK outperforms DPSK, due to MSK's robustness against filtering. This is essential in improving network flexibility and system cost-effectiveness, because, due to their spectral filtering effect, OADM's usually degrade transmission performance.

To further increase transmission capacity and reduce cost, systems with ultra-high spectral efficiency, e.g. 0.8 bit/Hz, are very attractive. One way to realize 0.8 spectral efficiency is to pack 40 Gbit/s channels with 50-GHz channel spacing. FIG. 7 shows the eye diagrams at different transmission distances in both MSK (FIG. 7B) and DPSK (FIG. 7A) based 0.8 spectral efficiency systems. We assume that $3^{rd}$-order super-Gaussian MUX and DMUX filters with 45-GHz 3-dB bandwidth are used. Again, MSK substantially outperforms DPSK.

While there are various techniques to generate an optical MSK signal in transmitter 100 of FIG. 1, the general concept is the same. If we use the example in FIG. 2, as stated previously, it is noted that the optical phases of all even-numbered pulses (in time slots 0, 2, 4, 6, . . . ) are either 0 or π, and that the optical phases of all odd-numbered pulses (in time slots 1, 3, 5, 7, . . . ) are either π/2 or 3π/2. This can be achieved in two steps. In the first step, the even-numbered pulses and odd-numbered pulses are phase-modulated to have a phase offset of π/2, with respect to each other. In the second step, all pulses are further phase-modulated to have either a π phase shift or no phase shift, in accordance with the value of the data to be transmitted. In some MSK transmitter designs, these two steps can be integrated into one device. One such design has been described in the co-pending application entitled "Optical MSK Modulator" that is identified above.

Other MSK transmitter designs using the same general concept are depicted in FIGS. 8 and 10. In FIG. 8, there is shown an optical RZ-MSK transmitter. The transmitter employs a continuous wave (CW) laser source 801, a 90-degree-alternate-phase (90°-AP) optical pulse generator 803, and a chirp-free DPSK data modulator 805. The 90°-AP pulse generator 803 generates optical pulses with a π/2 phase offset between the even- and odd-numbered optical pulses. The chirp-free DPSK data modulator 805 can be a Mach-Zehnder modulator biased at it null point. The input data from data source 809 is encoded by a differential MSK encoder 811, which produces the electronic driver signal on line 813 that is used to drive the data modulator to generate the desired MSK output signal at optical output 815.

Figure 9:
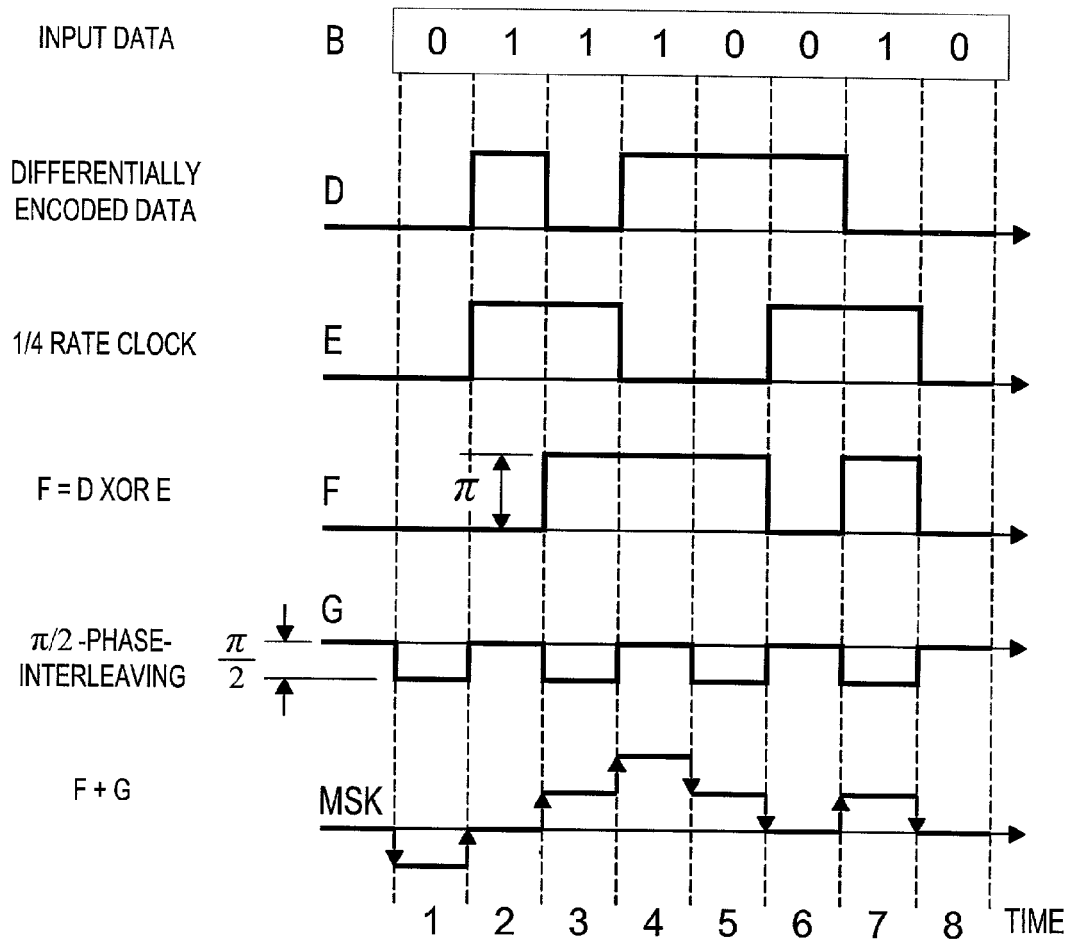
FIG. 9 is a diagram showing the relationship of various waveforms in order to achieve MSK encoding in an MSK transmitter.

FIG. 9 shows the differential MSK encoding procedure. It should be noted that this is just one example, and in real systems some details of the design may vary. We start with the same example binary data sequence "B" in FIG. 9. The data sequence is first differentially encoded to generate data sequence "D", in which a "0" in the original data sequence "B" generates a bit that is the same as the previous bit, and in which a "1" in the original data sequence "B" corresponds to a bit in digital data sequence D that is different from the previous bit. The digital data sequence "E" is simply a clock signal running at one quarter of the bit rate (with each cycle "1100" occupying four time slots). The driver signal applied to the data modulator 805 in FIG. 8 on input 813 is the digital data sequence "F", which is the result of an exclusive OR (XOR) operation between digital data sequence "D" and digital data sequence "E". This sequence is arranged such that a "1" represents a π degree phase shift, and a "0" represents a 0 degree phase shift. As shown in FIG. 9, by adding the 0 or π phase shift from digital data sequence "F" and the 0 or π/2 phase shift from digital data sequence "G" (90°-AP pulse generator), we achieve the phase shift desired for MSK coding; the result at the bottom of FIG. 9 is the same as the MSK signal illustrated in the top portion of FIG. 2.

FIG. 10 shows another arrangement of an MSK transmitter, which can be used for both RZ-MSK and NRZ-MSK, depending on the input pulse duration. This arrangement employs a pulsed optical input and an asymmetric Mach-Zehnder modulator. The input optical pulses at input 1001 have the same phase and a repetition rate equal to half of the bit rate (for example, 20 GHz repetition rate for a 40 Gb/s data rate). The input pulses are equally split in a splitter 1005, and propagate in the two arms Mach-Zehnder modulator, one of which is delayed by one bit period (for example, 25 ps for 40 Gb/s) with respect to the other by a suitable delay element 1009. The two arms of the Mach-Zehnder modulator include phase shift elements 1011 and 1012 that can be independently controlled by applied driver voltages to induce a 0 or π phase shift on the optical pulses. A DC bias voltage is applied to one of the two arms to induce a relative π/2 phase shift between the two arms. As a result, the phase shift elements 1011 and 1012 in the upper arm and the lower arm of the Mach-Zehnder modulator control the phases of the even- and odd-numbered pulses, respectively. The driver signal on each arm is a digital data sequence running at half the bit rate, and takes the respective values of digital data sequence "F" of FIG. 9 in the even or odd time slots. The phase-modulated optical pulses in the two arms of the Mach-Zehnder modulator are combined coherently in a combiner 1019 to produce the MSK signal on output 1021. If the input optical pulses have a duration (or full width half maximum (FWHM)) approximately equal to the bit period, the output is an NRZ-MSK signal. On the other hand, if the pulse duration is much smaller than a bit period, the output is an RZ-MSK signal.

Figure 11:
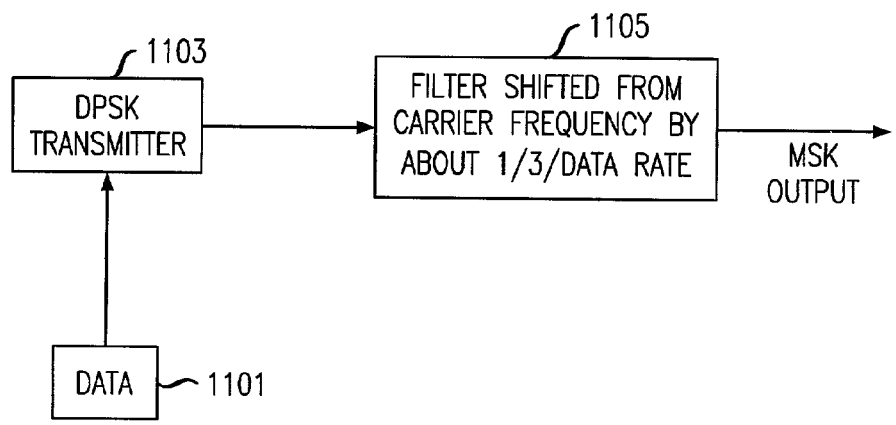
FIG. 11 is a block diagram illustrating another arrangement for providing an MSK encoded version of an input data signal.

There is yet another arrangement, illustrated in FIG. 11, for generating an MSK signal, which employs an RZ-DPSK transmitter 1103 and a vestigial sideband (VSB) filter 1105 (an optical filter which is intentionally detuned from the laser frequency). In this arrangement, data from a data source 1101 is first DPSK encoded in transmitter 1103, and then filtered in filter 1105. The key concept of using VSB filter 1105 is to shift the center of the RZ-DPSK optical power spectrum by Δf=¼T, where T is the bit period. For example, at 40 Gb/s, Δf=10 GHz. Such a frequency shift effectively produces a phase shift of $\Delta\Phi=2\pi\Delta fT=\pi/2$ (or 90 degrees) between two adjacent optical pulses, which is required for MSK.

Figure 12:
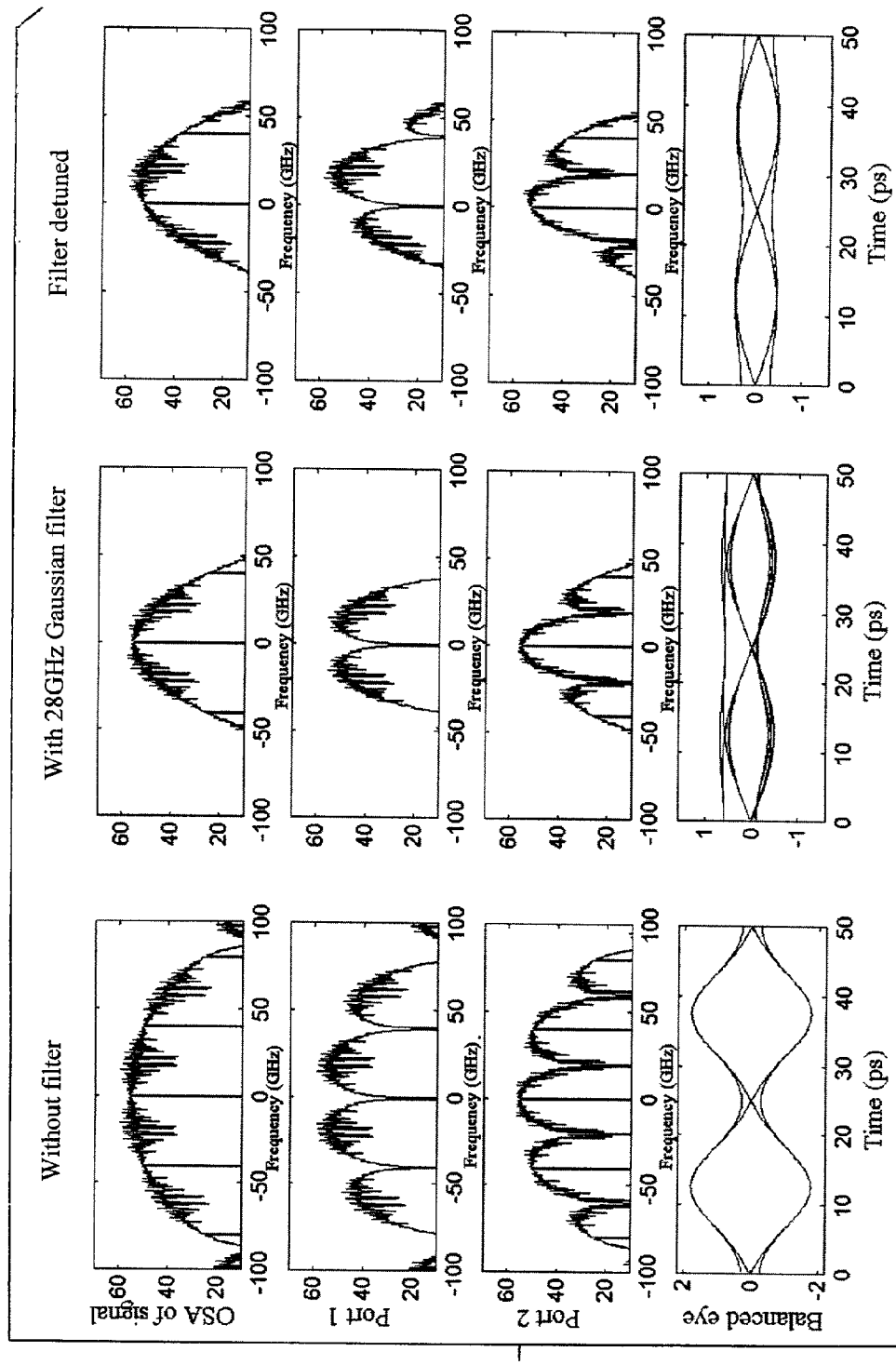
FIG. 12 illustrates simulation results for the arrangement of FIG. 11.

Some simulation results are illustrated in FIG. 12. The column on the left in FIG. 12 shows the optical spectra and the balanced eye diagram of a 40 Gb/s RZ-DPSK signal. The column in the middle shows the effect of a 28 GHz (FWHM) Gaussian optical filter on the RZ-DPSK signal. The column on the right shows the corresponding results as the filter is detuned from the laser frequency by a certain amount in order to shift the center of the power spectrum by 10 GHz. It is evident that the optical power spectra of the demodulated signals from the two ports of the delay interferometer are mirror-image-like, as in the case of MSK (see FIG. 4). And consequently, the balanced eye diagram is symmetric around zero.

While in the above description, the present invention was applied in the context of a high bit rate system, it is to be understood that the MSK technique as described above can also be used with systems with a variety of different bit-rates, as well as with many different fiber types and dispersion maps. For example, satisfactory performance can also be obtained with standard single mode fiber.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. An apparatus for encoding a sequence of optical pulses in accordance with a sequence of input data, comprising:
   means for generating a series of optical pulses, and
   means for modulating the phase of said optical pulses such that a digital "1" in the input data is represented by a $\pi/2$ phase shift of a current optical pulse with respect to the previous pulse, and a digital "0" in the input data is represented by a $-\pi/2$ phase shift of a current optical pulse with respect to the previous pulse;
   said modulating means including:
      a continuous wave (CW) laser source for generating optical pulses at a desired clock rate;
      an optical pulse generator for generating, responsive to said optical pulses at said desired clock rate, a 90-degree-alternate-phase (90°-AP) output in which successive pulses have a 90 degree phase difference,
      means for generating a differential MSK encoded signal in accordance with the input data such that the differential MSK encoded signal represents the result of exclusive OR'ing (a) a first data signal representing said input data and (b) a clock signal having a rate that is one half of the rate of said desired clock rate, and
      a chirp-free DPSK data modulator for encoding the phase of said 90-degree-alternate-phase (90°-AP) output in accordance with said differential MSK encoded signal.

2. The invention defined in claim 1 wherein said chirp-free DPSK data modulator is a Mach-Zehnder modulator biased at it's null point.

3. An optical transmission system to transmit an input data encoded optical pulses comprising:
   a continuous wave (CW) laser source;
   an optical pulse generator for generating optical carrier pulses at a desired clock rate having a 90-degree-alternate-phase (90°-AP) output such that successive pulses in the carrier pulse stream have a 90 degrees phase difference;
   a differential MSK encoder for encoding the optical carrier pulses in accordance with a stream of digital data from a data source;
   a chirp-free DPSK data modulator for encoding the phase of said 90-degree-alternate-phase (90°-AP) output in accordance with said differential MSK encoded signal to generate a modulated optical output signal;
   a transmitter to transmit the said modulated optical signal to a remote receiver over an optical transmission medium; and
   a receiver for recovering said digital data from the said encoded signal at the end of transmission;
   such that a digital "1" in the input data is represented by a $\pi/2$ phase shift of a current optical pulse with respect to the previous pulse, and a digital "0" in the input data is represented by a $-\pi/2$ phase shift of a current optical pulse with respect to the previous pulse.

4. The invention defined in claim 3 wherein said differential MSK encoder generates a signal code as a result of 'Exclusive OR' operation of a first data signal representing an input data from a data source and a clock signal having a rate that is one half of the rate of said desired clock rate.

5. The invention in claim 4 wherein a "1" in said input data is represented by a change in the value of said first data signal and "0" in said input data is represented by the absence of a change in the value of said first data signal.

6. The invention in claim 4 where the optical pulses may be in RZ or NRZ format.

7. The invention in claim 3 wherein the transmission medium is dispersion managed.

8. The invention in claim 3 wherein the transmission medium is quasi-linear.

9. The invention in claim 3 wherein said receiver includes a one-bit-delay interferometer and a balanced receiver.

10. An optical communication method for transmitting data encoded optical pulses the method comprising the steps of:
   generating optical carrier pulses from a cw light source at a desired clock rate having a 90-degree-alternate-phase (90°-AP) such that successive pulses in the carrier pulse stream have a 90 degrees phase difference;
   generating a differential MSK code for encoding the optical carrier pulses in accordance with a stream of digital data from a data source;
   modulating said 90-degree-alternate-phase (90°-AP) optical pulses output in accordance with said differential MSK code using a chirp-free DPSK data modulator thereby encoding the phase of signal to generate a modulated optical output signal;
   transmitting the modulated optical signal to a remote receiver over an optical transmission medium; and
   recovering said digital data from the said encoded signal at the end of transmission;
   such that a digital "1" in the input data is represented by a $\pi/2$ phase shift of a current optical pulse with respect to the previous pulse, and a digital "0" in the input data is represented by a $-\pi/2$ phase shift of a current optical pulse with respect to the previous pulse.

* * * * *